United States Patent [19]

Beck

[11] Patent Number: 4,543,745
[45] Date of Patent: Oct. 1, 1985

[54] MULTIPLE USE DECORATIVE EDGING

[76] Inventor: Malcolm Beck, Rte. 3, Box 210TA, San Antonio, Tex. 78218

[21] Appl. No.: 611,842

[22] Filed: May 18, 1984

[51] Int. Cl.⁴ ............................................. A01G 1/08
[52] U.S. Cl. .......................................... 47/33; 428/56
[58] Field of Search ............... 47/33, 24, 32; 405/284, 405/285, 31, 34, 35, 15, 16, 212; 52/102, 233; 256/19, 25, 73, 1, 25, 10, DIG. 2, 21; 428/56, 55, 77

[56] References Cited

U.S. PATENT DOCUMENTS

| D. 276,494 | 11/1984 | Novak et al. | D8/1 |
| 2,032,806 | 3/1936 | Loken | 428/167 |
| 2,619,686 | 12/1952 | Dombrowski | 52/233 |
| 2,651,143 | 9/1953 | Esmay et al. | 47/33 |
| 2,769,277 | 11/1956 | Keelor | 47/33 |
| 3,315,752 | 4/1967 | Pasquini | 47/33 |
| 3,994,479 | 11/1976 | Johannesson | 256/24 |

Primary Examiner—John E. Kittle
Assistant Examiner—Thomas C. Saitta
Attorney, Agent, or Firm—Gunn, Lee & Jackson

[57] ABSTRACT

An uneven, vertical row of timbers attached to a length of metal sheet, such that the metal sheet supports the timbers, acting as a barrier or edging to earth contained within, while the timbers provide a decorative part. The edging so constructed may be connected end to end to itself or other such edging units to form continuous shapes.

4 Claims, 3 Drawing Figures

MULTIPLE USE DECORATIVE EDGING

BACKGROUND

Lawn and garden edging presents numerous problems which conventional decorative edging does not satisfactorily solve. One form of conventional decorative edging uses multiple nonuniform timbers cut in nonuniform heights attached together from behind by one or more strands of wire. Such conventional decorative edging does not serve as an impenetrable barrier to weeds and grass as they may grow through the spaces between the vertical timbers. Further, with time, the timbers gradually displace with respect to each other if subjected to any pressure due to the fact that the attachment of the wires to the backs of the timbers typically develops horizontal slippage as the timbers age. Further, the use of wire attachments requires the manufacturer to use great care in affixing the wires to the back of the timbers as any deviation in placing the brads in the back of the timbers will cause the brads to miss the support wires which would completely negate their usefulness.

Still further, it is not currently practical to use such conventional decorative edging as a retainer wall for terracing because the use of wire supports attached to the back of the timbers is unsatisfactory for the purpose of retaining the timbers against pressure from behind the timbers.

An alternative conventional edging is comprised of plastic strips which are partly buried in the ground and are partly above ground. While these strips are impenetrable to weeds and grass and are thus useful to separate gardens and lawns from each other they are unsightly. Further, they are not generally useful as a retaining wall for use in terracing if the terrace is to be more than a few inches high due to the fact that such alternative conventional edging has little resistance to vertical pressure. Thus plastic edging, used alone, may collapse if used to retain more than a few inches of terracing.

The commercial advantages of producing a superior multiple use decorative edging which is, stronger, more attractive, more effective and has more uses than conventional decorative edging are enormous as many hundreds of thousands of dollars of edging, are sold in the United States each year.

SUMMARY OF THE INVENTION

Multiple use decorative edging which combines the attractiveness of a row of vertical timbers as landscaping edging and the utility of sheet metal as a landscaping edging to produce a structure which, is stronger, is more attractive, is more effective, is easier to use, is easier to manufacture, and has more uses than conventional decorative edging. The invented edging is impenetrable to weeds and grass, provides greater structural stability than conventional edging, is useful in terracing and remains attractive for a longer period of time than conventional edging.

A synegistic result of combining the elements of the invented edging is that the various elements do not simply perform their known functions. Thus the timbers are not merely attractive, but, when firmly stapled to the sheet of metal 52 as described provide much additional support to the sheet of metal to make the invented edging useful as a retaining wall for terracing. Likewise, the sheet of metal makes the timbers more attractive by more firmly holding them in place, increases their useful life by holding them in place longer than prior art methods and increases their commercial usefulness by introducing certain economie in their manufacture such as mass production, production in panels which can be assembled and shaped in the field.

DESCRIPTION OF THE PREFERRED EMBODIMENT

Figure 1:
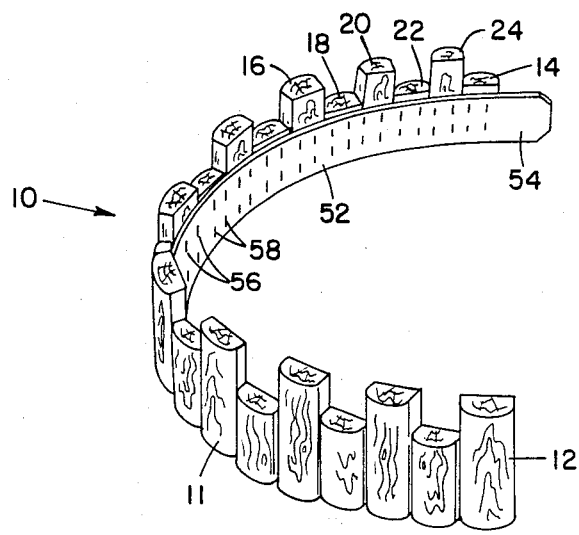
FIG. 1 shows a side perspective view of one panel 10 of the invented edging. The sheet of metal 52 is shown attached by upper and lower rows of staples 56 and 58 to the back of the nonuniform timbers.

For a detailed description of the preferred embodiment and the various species, reference is made to the attached several views wherein identical reference characters will be used to refer to identical or equivalent components throughout the various views and the following description.

Figure 2:
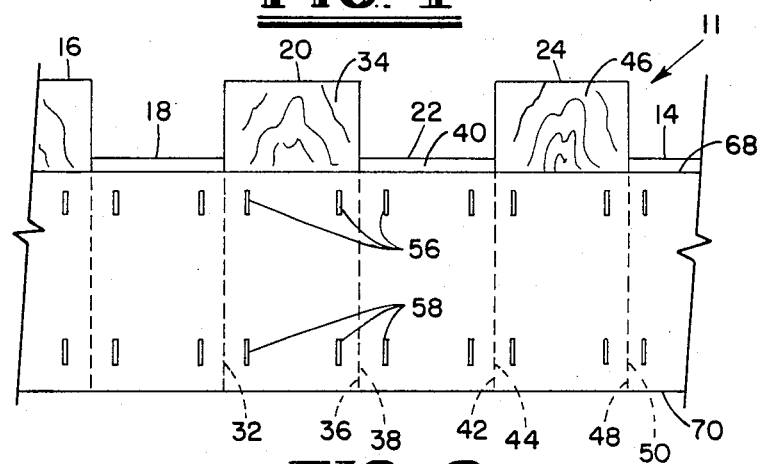
FIG. 2 shows a rear view of a portion of a panel of the invented edging.

Referring to FIGS. 1 and 2 of the drawings a side perspective view of one panel of the invented decorative edging 10 and a rear view of a portion of the invented edging 11 is shown respectively. On the first side of the invented edging 10 is first timber 12. On the last end of the timbers is last timber 14.

The intermediate timbers 16, 18, 20, 22, and 24 of FIG. 2 correspond to the like numbered timbers of FIG. 1 and to represent all intermediate timbers generally. These timbers are preferably 2.25 inches thick and 3.5 inches wide with a semicircular front side 19. The preferable panel of timbers 10 has long timbers 16, 20 and 24 with an average height of eight (8) inches and short timbers 18 and 22 alternating between them with a height of six (6) inches. This sawtooth configuration presents a rough "wilderness" look when weathered for a few months which is very attractive.

Timber 18 has left, rear and right sides 26, 28, and 30 respectively. Intermediate timber 20 has left, rear and right sides 32, 34 and 36 respectively. Intermediate timber 22 has left, rear and right sides 38, 40 and 42 respectively. Intermediate timber 24 has left, rear and right sides 44, 46 and 48 respectively. Last timber 14 has left, rear and right sides 50, 52, and 54 respectively.

A sheet of metal 52, preferably a sheet of 28 guage galvanized steel having a width of 5.5 inches and a length of 101 inches is attached to the rear sides 28, 34, 40, 46 and 54 by means of a first row of staples 56 and a second row of staples 58.

The staples for a unit of the preferred size are preferably one (1) inch long staples having a one-half ($\frac{1}{2}$) inch head. Staples for the improved edging which are to be used for terracing or for edging which is significantly taller will use longer staples.

Lip 54 of the sheet of metal 52 projects four (4) inches beyond the right side 54 of the last timber 14.

It can be seen that the sheet of metal 52 as attached by the first and second rows of staples 56 and 58 to the rear sides 28, 34, 40, 46, and 54 holds sides 36 and 38, sides 42 and 44, sides 48 and 50 closely together. Further, the first row of staples 56 and the second row of staples 58 are sufficiently separated to prevent any rotation of individual timbers about an axis comprised of the staples in that timber.

Figure 3:
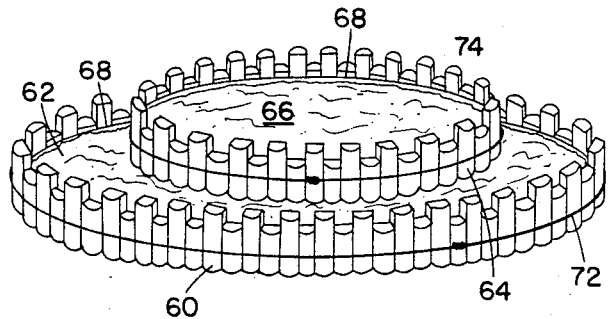
FIG. 3 shows multiple panels of the invented edging which are connected into two continuous rows 60 and 64 and attractively arranged with appropriate first and second earth fills 62 and 66 to provide multiple level terracing.

FIG. 3 shows a first row of timbers 60 which serves as a terrace supporting a first earth fill 62. A second row of timbers 64 is set in a shallow trench in the top of first earth fill 62 and is itself filled with a second earth fill 66. For the purpose of further explaining the construction of the first and second rows of timbers as shown in FIG. 2 it will be assumed that they are each comprised of a sufficient number of panels 10 of the invented decorative edging as shown in FIGS. 1 and 2. This is accomplished by stapling the lip 54 of one panel 10 to the rear of the first timber 12 of another panel 10 until a sufficient number of panels 10 have been connected and a continuous row of the length is completed. After the panels 10 are connected to form a continuous edging it is bent into whatever shape is desired, a rectangle, a square, a star, a circle, etc. In FIG. 3 the shape chosen for the first row of timbers 60 is a circle.

Once the first row of timbers 60 has been connected and shaped it is filled with the first earth fill 62 to the desired level. It is important that the first earth fill 62 be filled in to a level which is lower than that of the upper edge 68 of the sheet of metal 52 and above the lower edge 70 of the sheet of metal 52. If the upper surface of the first earth fill 62 is not within this space the sheet of metal 52 will not serve as an effective impenetrable barrier to keep the plant growth of the first terrace level of first earth fill 58 from forcing its way through the spaces between the timbers of the first row 60.

It is seen that when the first row of timbers is formed into a circle as shown in FIG. 3 that the completely flush abutment of sides 36 and 38, sides 42 and 44, and sides 48 and 50 is lost as the forward edges of those sides are separated due to the longer circumference of the outside of the first row than the inside. Thus only the uneven meeting of the very rear edges of sides 36 and 38, sides 42 and 44, and sides 48 and 50 of the timbers would keep the first earth fill and the plant growth from the first terrace level from forcing its way out between the timbers 16, 18, 20, 22 and 24 were it not for the imposition of the sheet of metal 48 as an impenetrable barrier.

After the first earth fill 62 of the first terrace level has been smoothed out a second row of edging 64 may be constructed on the upper of the first terrace in the same manner as the first row of edging 60 was constructed on the original surface. After construction of the second row of edging 64 and shaping it into the desired configuration it is placed within a shallow trench in the top of the first earth fill 62. The space formed within the now continuous second row 64 is filled in with a second earth fill 66 to the desired level to create a second terrace. The benefits described with respect to the first row 60 and the first terrace are repeated with respect to the second row 66 and second terrace.

Those skilled in the art will appreciate that more than one shape of edging can be constructed and that multiple level terraces can be constructed using the invention. Those skilled in the art will further appreciate that the invention is useful for other depths of terracing than that described above and that each row of edging may be adapted to its intended use by making it taller, shorter, thinner, wider, longer or less long as may be appropriate.

The sheet of metal 52 must be suffioiently thick and rigid to provide sufficient structural support to the row of timbers in the panel 10 to prevent the individual timbers from being pushed from the row of timbers in the panel 10. Thin gauges of sheet metal are not desirable as staples may be pulled through them when the timbers are subjected to pressure from their rear side or the row will deform and produce an unsightly appearance. While staples having an extremely large surface area may be used to permit the use lesser gauge sheets of metal 52 this is not the preferred.

The described sheet of metal 52 is sufficiently rigid to prevent substantial movement of the timbers, is sufficiently flexible to permit the panels to be shaped and installed by human workers in the field without the aid of machinery and is sufficiently strong to prevent the staples 56 and 58 from pulling through it. Both the sheet of metal 52 and the staples 56 and 58 are preferrably galvanized to delay rusting and to extend the life of the invented edging. Similarly, the timbers are preferrably wolmanized to increase their useful life.

Attachment of the timbers together by the sheet of metal 52 and the first and second rows of staples 56 and 58 provides a much firmer attachment between the timbers than does the prior art method of stapling wires to the rear sides of the timbers. Whereas upon the aging of timbers a wire will begin to slip through the staples thus permitting displacement of the timbers amongst themselves even in the absence of any staples coming from the timbers, the shrinkage of timbers over time has a much lesser effect on the structural stability provided by the sheet metal 52. This is because the sheet metal 52 will not slide through the staples as the wire does. Further, the use of sheet metal 52 as the means of attaching the timbers together rather than wires greatly simplifies the manufacture of the decorative edging. It can be seen that the effort and machinery sophistication required to accurately place staples about single strands of wire is greater than that required to staple through a broad sheet of metal 52.

The lower ends of the invented edging are placed in a shallow trench for stability if the edging is being used a retaining wall or for terracing. This is also useful if the invented edging is being used to divide a garden from a lawn, etc. as the upper surface of the ground being separated must be above the lower side 70 of the sheet of metal 52 and below the upper side 68 of the sheet of metal 52.

The invented edging is useful as a retaining wall as the sheet of metal 52 and timbers, when securely attached by the staples, form a solid integral unit capable of resisting horizontal vertical pressures.

To further strengthen the edging when it is to be used as a terrace wall or a retaining wall a strong wire 72 may be attached to the upper front face of the timbers near the top of the lower timbers 18, 22, 24, etc. and extended the entire length of the panel 10. A sufficient extension of wire is left protruding at each end of each panel of timbers 10 to permit it to be twisted to either a wire from the next panel of timbers 10 the other end of the wire at the other end of that panel of timbers 10. When completed, this outer retaining wire 72 or 74 assists in retaining the timbers against the sheet of metal 52.

The invented edging is preferrably prepared in panels 10 which are then either spliced together or shortened as the need arises in the field to form retaining walls, terraces, garden edging, flower bed edging, borders, tree truck protection, mobile home skirting, fencing, etc. of indefinite lengths. The preferred panels are comprised of approximately thirty treated timbers of approximately three (3) to three and one-half (3½) inches in width each.

A more pleasing appearance is produced if the timbers are regularly offset to produce a sawtooth pattern.

Many difficulties are encountered in manufacturing the invented panels of timbers 10 as the wood timbers are often of nonuniform length, nonuniform width, nonuniform thickness and are otherwise of uneven consistency and dimensions. The invented method of producing the panels of timbers is to place the timbers face down in a row on a long empty air bladder. The bladder must be capable of accepting high air pressure and considerable physical abuse. Once placed on the bladder the timbers are pushed closely together side by side face down on the bladder to form a continuous row of timbers. To produce a panel of timbers 10 with a sawtooth top pattern the timbers are pushed against a series of metal teeth which abut against every other timber the non-abutting timbers slipping through to teeth until they are blocked by a retaining bar. A dual set of bars is then lowered on to the rear side of the timbers. The first bar is aligned along the bottom of the timbers which have been pushed into the open portions of the metal jig. This is to say that the first bar does not extend downward past the bottom of any timber. Likewise, a second bar is placed along the top of the rear side of the timbers, near the top of the timbers which have been pushed to abut against the teeth of the sawtooth pattern. Next, the long air bladder is filled with coompressed air. As the bladder fills with air it adapts to the various contours and differences between the timbers to permit it to uniformly compress all of the timbers up against the first and second bars.

Once the timbers have been secured against the bars the bottom ends of the timbers are cut off to provide a uniform bottom of the row of timbers by using the outer edge of the first bar as a guide for the saw. A sheet of metal 52 is placed between the first and second bars on the rear face of the timbers with approximately four (4) inches of a lip 54 of the sheet of metal 52 extending from one end of the panel of timbers 10. The sheet of metal 52 is stapled to the panel of timbers 10 by stapling an upper row of staples 56 into the timbers and a lower row of staples 58 into the timbers. At least two staples are stapled into each timber in the upper row 56 and at least two staples are stapled into each timber in the lower row 58.

The air is released from the bladder and the panel of timbers 10 removed for use.

It is apparent from the above description that significant improvements in the art of edging and retaining walls are achieved by the instant invention.

While the invention has been described in connection with the preferred embodiment, it is not intended to limit the invention to the particular form set forth, but, on the contrary, it is intended to cover such alternatives, modifications and equivalances as may be included within the spirit and scope of the invention as defined by the appending claims.

I claim:

1. Multiple use decorative landscape edging comprised of:

multiple timbers, said timbers being slightly nonuniform in thickness, height and width, substantially all of said timbers having a greater height than width and a greater width than thickness, said timbers being closely aligned, side by side, in a first row of timbers;

a sheet of metal which is sufficiently long to extend at least from its first end at near the first end of said first row of timbers to its second end approximately four (4) inches beyond the second end of said first row of timbers, the portion of said sheet of metal which extends beyond said second end of said row of timbers being a first lip; sufficiently wide to extend from close to the bottom of said first row of timbers to at least two-thirds the average height of said first row of timbers; sufficiently impenetrable to weeds and grass to prevent weeds and grass from growing through it; sufficiently rigid to provide sufficient structural support to said first row of timbers to prevent individual said timbers from being pushed from said sheet of metal; sufficiently strong to retain fasteners driven through said sheet of metal from behind said sheet of metal and into said timbers and sufficiently flexible to permit it to be easily formed into various shapes in the field and installed as decorative landscape edging by human workers without the aid of machinery; said sheet of metal being attached to the rear of said first row of timbers by means of at least an upper row of individual fasteners which are driven through said sheet of metal and into each of said individual timbers in said first row of timbers and a lower row of attachment means comprised of individual fasteners which are driven through said sheet of metal and into each of said individual timbers in said first row of timbers;

said first lip being capable of being used for attaching said second end of said first row of timbers to a first end of any similar row of timbers second by affixing said first lip over a said first end of said sheet of metal located on the rear side of a said first end of said first row of timbers by driving additional fasteners through said lip, said first end of said sheet of metal and into said rear of said timber located at the first end of said any similar row of timbers.

2. The invention of claim 1 wherein said sheet of metal is 28 guage steel and said attachment means are steel staples, said sheet of steel and said staples are galvanized, said first row timbers is comprised of approximately 30 wolmanized timbers of approximately 3 inches in width each to form a panel of approximately eight feet in length which is capable of being spliced to similar panels to form indefinite lengths of decorative edging and said upper end of said timbers are regularly offset.

3. The invention of claim 2 wherein said decorative edging is adapted for use in a terrace by attaching a strong wire to the upper front face of said first row of timbers near the top of said timbers with a sufficient amount of wire protruding from both said first end and said second end to be twisted together to form an outer retaining wire to retain said timbers against said sheet of metal.

4. A decorative multiple terrace comprised of:

a first continuous row of decorative edging comprised of: multiple timbers, said timbers being slightly nonuniform in thickness, height and width, substantially all of said timbers having a greater height than width and a greater width than thickness, said timbers being closely aligned, side by side, in a first row of timbers; a sheet of metal which is sufficiently long to extend at least from its first end at near the first end of said first row of timbers to its second end approximately four (4) inches beyond the second end of said first row of timbers, the portion of said sheet of metal which extends beyond said second end of said row of timbers being a first lip; sufficiently wide to extend from close to the bottom of said first row of timbers to at least two-thirds the average height of said first row of timbers; sufficiently impenetrable to weeds and grass to prevent weeds and grass from growing through it; sufficiently rigid to provide sufficient structural support to said first row of timbers to prevent individual said timbers from being pushed from said first row of timbers if attached to said sheet of metal; sufficiently strong to retain fasteners driven through said sheet of metal from behind said sheet of metal and into said timbers and sufficiently flexible to permit it to be easily formed into various shapes in the field and installed as decorative landscape edging by human workers without the aid of machinery; said sheet of metal being attached to the rear of said first row of timbers by means of at least an upper row of individual fasteners which are driven through said sheet of metal and into each of said individual timbers in said first row of timbers and a lower row of attachment means comprised of individual fasteners which are driven through said sheet of metal and into each of said individual timbers in said first row of timbers; said first lip being capable of being used for attaching said second end of said first row of timbers to a first end of any similar row of timbers by affixing said first lip over a said first end of any similar row of timbers by driving additional fasteners through said lip, and into said first end and said rear of said timber located at the first end of said any similar row of timbers; said combination of multiple rows of fasteners comprising a panel of multiple use decorative landscape edging which is capable of being attached to other panels to form edging of indefinite length, is capable of being formed into various shapes in the field and installed as an edging means by human workers without machinery, said panel being connected to other similar panels to form a continuous first continuous row of decorative edging, the lower ends of said first continuous row of decorative edging being placed in a shallow trench located on the surface of the earth for stability;

a first fill of earth sufficient to fill the space within said first continuous decorative row of edging from ground level to a level between the lower edge of said sheet of metal and the upper edge of said sheet of metal, said earth being substantially uniformly distributed within said space;

a second continuous row of decorative edging similar to said first continuous row of decorative timbers but having a lesser circumference than said first continuous row and which is located in a shallow trench which is located in the upper surface of said first level of earth;

a second fill of earth sufficient to fill the space within said second continuous row of decorative edging from said upper surface of said first fill of earth to a level between the lower edge of said second sheet of metal of said second continuous row of decorative edging and the upper edge of said second sheet of level of said second continuous row of decorative edging, said second fill of earth being substantially uniformly distributed within said second open space.

* * * * *